Patented Feb. 19, 1952

2,586,072

UNITED STATES PATENT OFFICE 2,586,072

PREPARATION OF DIACETYL WITH BUTTER CULTURES

Melvin Wayne Marcoux, Chicago, Ill., assignor to Armour and Company, Chicago, Ill., a corporation of Illinois No Drawing. Application June 21, 1947, Serial No. 756,337

5 Claims. (Cl. 99—140)

This invention relates to the production of diacetyl with butter cultures consisting of a single species of organism.

An object of the invention is to provide a process in which skimmed milk is treated in a novel manner for the preparation of diacetyl in large volume and in a relatively short period of time. A still further object is to provide a process for the production of diacetyl contained in a milk product for the treatment of oleomargarine and the like, the diacetyl being produced through the use of a single type of organism and under conditions which greatly accelerate the production of diacetyl. Other specific objects and advantages will appear as the specification proceeds.

In one embodiment of my invention, pasteurized skimmed milk is inoculated with a single organism, such as, for example, *Streptococcus diacetylactis*, and incubated at temperatures of from 75–80° F. The incubation may be continued until the titratable acidity reaches 0.75–0.80%.

I have discovered that excellent results are obtained when the incubation is carried on at 75–80° F. until a titratable acidity of 0.55% lactic acid is present. Then the material is cooled to about 68–70° F. for the remainder of the ripening period, during which time the titratable acidity reaches 0.75–0.80%.

By regular methods heretofore employed, it requires from 16 to 20 hours to develop a fully ripened culture. By the above process, in which the initial incubation temperature of a single species culture is raised to the range described, the process can be completed within from 8 to 12 hours.

In the process above described, I prefer to pasteurize skimmed milk as the first step. I next add the single organism (about 1–5% inoculation). I incubate at 75–80° F. until a titratable acidity of 0.55% lactic acid is present. As a final step, I cool the material to 68–70° F. or thereabouts for the remainder of the ripening period, during which time the titratable acidity reaches 0.75–0.80%. During this final step the material is continually agitated to produce aeration and thereby oxidize acetylmethyl carbinol to diacetyl.

The actual diacetyl production occurs during the final step and at the lower temperature. However, by the use of the elevated temperature in the initial incubation step, it is possible to accelerate the process so that from 5 to 6 hours can be saved in preparing a batch of oleomargarine, for instance.

There are a number of well-known single organisms which may be used for the production of diacetyl. I have found that unusually good results are had when using *Streptococcus diacetylactis*, which forms acetylmethylcarbinol from citric acid of the milk. The microorganism *Streptococcus diacetylactis* is deposited with the American Type Culture Collection, Washington, D. C., and has been assigned the accession number 11007 by that depository.

In carrying out the modification of the process in which the cooling step is not employed, the pasteurized skimmed milk, partially skimmed milk or whole milk is inoculated with the single organism and the temperature raised to 75–80° F., agitation being employed throughout the incubation. The culture is held at this elevated temperature and under agitation until the titratable acidity goes beyond 0.55% and approaches 0.80%. It is during this titratable acidity increase that the production of diacetyl occurs. Compared with conventional processes which require from 16 to 20 hours to develop a fully ripened culture, the present process, in which the temperature is held in the high range until the acidity approaches 0.80%, can be contemplated within from 8 to 12 hours.

By holding the culture at the desired high range of temperatures for definite periods of time and until the titratable acidities indicated are obtained, an unusually high yield of diacetyl is obtained. It is important that the high range of temperatures be employed, at least until a titratable acidity of 0.55% of lactic acid is present. The time of the entire process should not extend substantially beyond 12 hours.

While in the foregoing specification, I have set forth specific steps in detail for the purpose of illustrating specific embodiments of the invention, it will be understood that such details may be varied widely by those skilled in the art without departing from the spirit of my invention.

I claim:

1. In a process for the preparation of diacetyl, the steps of inoculating milk with *Streptococcus diacetylactis*, and incubating the mixture of a temperature of from 75–80° F. for a period less than 12 hours and until at least a titratable acidity of about 0.55% lactic acid is present.

2. In a process for the preparation of diacetyl, the steps of inoculating milk with *Streptococcus diacetylactis*, incubating the same at a temperature of from 75–80° F. for a period less than 12 hours and until a titratable acidity of about 0.80% is reached, and agitating the mixture during incubation.

3. In a process for the preparation of diacetyl, the steps of inoculating pasteurized skimmed milk with *Streptococcus diacetylactis*, incubating the mixture at a temperature of about 75–80° F. for a period less than 12 hours and until a titratable acidity of 0.55% lactic acid is present, maintaining the temperature of about 68–70° F. until the titratable acidity reaches about 0.75–0.80%, and agitating the mixture during incubation at a temperature of about 68–70° F.

4. In a process for the preparation of diacetyl, the steps of inoculating pasteurized skimmed milk with *Streptococcus diacetylactis*, maintaining the mixture at a temperature of from 75–80° F. for a period less than 12 hours and until a titratable acidity of about 0.80% lactic acid is present, agitating the mixture during incubation, and then discontinuing the incubation treatment.

5. In a process for the preparation of diacetyl, the steps of adding *Streptococcus diacetylactis* to milk, incubating the mixture at a temperature of about 75–80° F. until a titratable acidity of about 0.55% lactic acid is present, and lowering the temperature to about 68–70° F. until the titratable acidity reaches 0.75–0.80%.

MELVIN WAYNE MARCOUX.

REFERENCES CITED

The following references are of record in the file of this patent:

UNITED STATES PATENTS

| Number | Name | Date |
| --- | --- | --- |
| 2,196,239 | Werkman | Apr. 9, 1940 |

OTHER REFERENCES

Bergey's Manual (6 ed.), of record, pages 325, 399.

Bergey's Manual of Determinative Bacteriology, 3rd ed., 1930, p. 62.

Bergey's Manual of Determinative Bacteriology, 6th ed., 1948, pp. 325 and 339.

Chem. Abstr., 1940, p. 183$^6$, Wiley et al.
Chem. Abstr., 1940, p. 1760$^2$, Wiley et al.
Chem. Abstr., 1943, p. 1572$^4$, Hoecker.

The Butter Industry by Hunziker, 3rd. (1940), pages 327–331, 334 and 335.